United States Patent
Convertino et al.

(10) Patent No.: US 11,032,311 B2
(45) Date of Patent: Jun. 8, 2021

(54) METHODS FOR DETECTING AND MITIGATING MALICIOUS NETWORK ACTIVITY BASED ON DYNAMIC APPLICATION CONTEXT AND DEVICES THEREOF

(71) Applicant: F5 Networks, Inc., Seattle, WA (US)

(72) Inventors: Sebastian Michael Convertino, Seattle, WA (US); Judge Kennedy Singh Arora, San Jose, CA (US)

(73) Assignee: F5 NETWORKS, INC., Seattle, WA (US)

( * ) Notice: Subject to any disclaimer, the term of this patent is extended or adjusted under 35 U.S.C. 154(b) by 67 days.

(21) Appl. No.: 16/216,937

(22) Filed: Dec. 11, 2018

(65) Prior Publication Data

US 2020/0186563 A1    Jun. 11, 2020

(51) Int. Cl.
*H04L 29/06* (2006.01)
*G06N 20/00* (2019.01)
*H04L 12/24* (2006.01)

(52) U.S. Cl.
CPC ......... *H04L 63/1441* (2013.01); *G06N 20/00* (2019.01); *H04L 41/142* (2013.01); *H04L 41/145* (2013.01); *H04L 63/1416* (2013.01); *H04L 63/1425* (2013.01); *H04L 63/20* (2013.01)

(58) Field of Classification Search
CPC ............. H04L 63/1441; H04L 63/1416; H04L 63/1425; H04L 63/20; H04L 41/142; H04L 41/145; G06N 20/00
See application file for complete search history.

(56) References Cited

U.S. PATENT DOCUMENTS

| | | | |
|---|---|---|---|
| 9,336,239 | B1* | 5/2016 | Hoffmann ............... G06K 9/62 |
| 9,942,197 | B2 | 4/2018 | Galbreath et al. |
| 10,187,408 | B1 | 1/2019 | Call et al. |

(Continued)

OTHER PUBLICATIONS

F5 Networks, Inc., "BIG-IP® Application Security Manager®: Attack and Bot Signatures", Manual, Feb. 13, 2017, 48 pages, Version 13.0, F5 Networks, Inc., Retrieved from the Internet: <https://support.f5.com/kb/en-us/products/big-ip_asm/manuals/product/asm-bot-and-attack-signatures-13-0-0.html>.

(Continued)

*Primary Examiner* — Sher A Khan
(74) *Attorney, Agent, or Firm* — Troutman Pepper Hamilton Sanders LLP (Rochester)

(57) ABSTRACT

Methods, non-transitory computer readable media, attack mitigation apparatuses, and network security systems that maintain an application context model for a protected application based on ingested logs. The application context model includes a map of network infrastructure associated with the protected application. Using the application context model, potential attack(s) against the protected application are identified and possible mitigation action(s) to take in response to one or more of the identified potential attack(s) are scored. A stored policy is executed to evaluate the possible mitigation action(s) based on the scoring. One or more of the possible mitigation action(s) are initiated on the identified potential attack(s) based on the evaluation. With this technology, malicious network activity can be more effectively and quickly detected and mitigated resulting in improved network security.

28 Claims, 7 Drawing Sheets

(56) References Cited

U.S. PATENT DOCUMENTS

| | | | |
|---|---|---|---|
| 10,326,790 B2 | 6/2019 | Mattson et al. | |
| 2006/0242694 A1* | 10/2006 | Gold | H04L 63/1441 726/13 |
| 2009/0006607 A1* | 1/2009 | Bu | H04L 45/745 709/224 |
| 2013/0139214 A1 | 5/2013 | Chesla | |
| 2014/0096251 A1* | 4/2014 | Doctor | G06F 21/55 726/23 |
| 2014/0380467 A1* | 12/2014 | Winquist | H04L 63/1408 726/22 |
| 2015/0128274 A1 | 5/2015 | Giokas | |
| 2015/0341379 A1 | 11/2015 | Lefebvre et al. | |
| 2016/0182542 A1* | 6/2016 | Staniford | H04L 63/1416 726/23 |
| 2016/0330236 A1* | 11/2016 | Reddy | H04L 63/1425 |
| 2016/0373474 A1* | 12/2016 | Sood | G06F 21/50 |
| 2017/0126627 A1 | 5/2017 | Yang et al. | |
| 2017/0222811 A1* | 8/2017 | Claes | H04L 9/0643 |
| 2018/0103052 A1* | 4/2018 | Choudhury | H04L 63/1416 |
| 2018/0152474 A1* | 5/2018 | Winquist | H04L 43/16 |
| 2018/0205746 A1* | 7/2018 | Boutnaru | H04L 63/0236 |
| 2018/0234435 A1 | 8/2018 | Cohen et al. | |
| 2019/0052570 A1* | 2/2019 | Blumenthal | H04L 69/40 |
| 2019/0052675 A1* | 2/2019 | Krebs | H04L 63/1416 |
| 2019/0166141 A1 | 5/2019 | Xu et al. | |
| 2019/0318136 A1* | 10/2019 | Martin | G06F 21/87 |
| 2020/0120119 A1* | 4/2020 | Kalra | H04L 49/25 |

OTHER PUBLICATIONS

F5 Networks, Inc., "BIG-IP® Application Security Manager®: Getting Started", Manual, Nov. 13, 2017, 46 pages, Version 13.1, F5 Networks, Inc., Retrieved from the Internet: <https://support.f5.com/kb/en-us/products/big-ip_asm/manuals/product/asm-getting-started-13-1-0.html>.

F5 Networks, Inc., "BIG-IP® Application Security Manager®: Implementations", Manual, Aug. 10, 2018, 35 pages, F5 Networks, Inc., Retrieved from the Internet: <https://support.f5.com/kb/en-us/products/big-ip_asm/manuals/product/big-ip-asm-implementations-14-0-0.html>.

F5 Networks, Inc., "BIG-IP® Application Security Manager®: External Monitoring of Big IP Systems Implementations", Manual, Aug. 10, 2018, 21 pages, Version 14.0, F5 Networks, Inc., Retrieved from the Internet: <https://support.f5.com/kb/en-us/products/big-ip_ltm/manuals/product/external-monitoring-of-big-ip-systems-implementations-14-0-0.html>.

F5 Networks, Inc., "BIG-IP® Analytics: Implementations", Manual, Aug. 10, 2018, 5 pages, Version 14.0, F5 Networks, Inc., Retrieved from the Internet: <https://support.f5.com/kb/en-us/products/big-ip_analytics/manuals/product/big-ip-analytics-implementations-14-0-0.html>.

Extended European Search Report for corresponding EP Application Serial No. 19214358.4, dated Mar. 25, 2020.

"F5 Device ID+ —Real-time Intellignece About Each Deivce Visiting Web and Mobile Websites," Product Overview, Shape—Part of F5 Networks, Inc., <https://info.shapesecurity.com/rs/935-ZAM-778/images/F5-Shape-DeviceID-Product-Overview.pdf>, pp. 1-5, last accessed Feb. 1, 2021.

"Safe—Shape AL Fraud Engine™," Shape—Part of F5 Networks, Inc., <https://info.shapesecurity.com/rs/935-ZAM-778/images/Shape%20AI%20Fraud%20Engine-Product%20Datasheet.pdf>, pp. 1-2, last accessed Feb. 1, 2021.

"Shape Defense™ —Al-Powered Web and Mobile Fraud Prevention for Organizations of All Sizes," Shape—Part of F5 Networks, Inc., <https://info.shapesecurity.com/rs/935-ZAM-778/images/Shape%20Defense%20-%20Product%20datasheet.pdf>, pp. 1-2, last accessed Feb. 1, 2021.

"Shape Enterprise Defense—Solution Overview," Shape, <https://info.shapesecurity.com/rs/935-ZAM-778/images/Shape%20Enterprise%20Defense%20Solution%20Overview.pdf>, pp. 1-5, last accessed Feb. 1, 2021.

* cited by examiner

METHODS FOR DETECTING AND MITIGATING MALICIOUS NETWORK ACTIVITY BASED ON DYNAMIC APPLICATION CONTEXT AND DEVICES THEREOF

FIELD

This technology generally relates to network security and, more particularly, to methods and devices for improved detection and mitigation of malicious network activity based on dynamic application context.

BACKGROUND

Web applications are increasingly utilized, complex, and under attack by malicious actors. Many networks include security products or devices that identify and mitigate malicious network activity to defend web applications from denial of service attacks and credential stealing or unauthorized access attacks, among many others. However, current security devices are generally not aware of the dynamic configuration and context of the applications they protect, and are therefore unable to effectively or efficiently provide security or intrusion analysts with such information in response to an alert.

Unfortunately, when an alert is generated, intrusion analysts must research and coordinate with other analysts and data sources to analyze the associated context and determine whether an attack has occurred and, if so, how to effectively mitigate it. The required research and coordination consumes valuable time before a mitigation is identified and implemented, during which an attacker often has compromised the application and obtained, disrupted, or destroyed critical data. Accordingly, current network security products are unable to quickly identify and effectively mitigate complex threats, resulting in reduced network security for web applications.

SUMMARY

A method for attack mitigation, implemented in cooperation with a network security system comprising one or more attack mitigation modules, network infrastructure modules, network traffic management or security modules, or client modules, includes maintaining an application context model for a protected application based on ingested logs. The application context model includes a map of network infrastructure associated with the protected application. Using the application context model, potential attack(s) against the protected application are identified and possible mitigation action(s) to take in response to one or more of the identified potential attack(s) are scored. A stored policy is executed to evaluate the possible mitigation action(s) based on the score. One or more of the possible mitigation action(s) are initiated on the identified potential attack(s) based on the evaluation.

An attack mitigation apparatus including memory including programmed instructions stored thereon and one or more processors configured to be capable of executing the stored programmed instructions to maintain an application context model for a protected application based on ingested logs. The application context model includes a map of network infrastructure associated with the protected application. Using the application context model, potential attack(s) against the protected application are identified and possible mitigation action(s) to take in response to one or more of the identified potential attack(s) are scored. A stored policy is executed to evaluate the possible mitigation action(s) based on the score. One or more of the possible mitigation action(s) are initiated on the identified potential attack(s) based on the evaluation.

A non-transitory computer readable medium having stored thereon instructions for attack mitigation including executable code that, when executed by one or more processors, causes the processors to maintain an application context model for a protected application based on ingested logs. The application context model includes a map of network infrastructure associated with the protected application. Using the application context model, potential attack(s) against the protected application are identified and possible mitigation action(s) to take in response to one or more of the identified potential attack(s) are scored. A stored policy is executed to evaluate the possible mitigation action(s) based on the scoring. One or more of the possible mitigation action(s) are initiated based on a result of the evaluation to mitigate the one or more of the identified potential attack(s).

A network security system includes one or more attack mitigation modules, network infrastructure modules, traffic management or security modules, or client modules, memory comprising programmed instructions stored thereon, and one or more processors configured to be capable of executing the stored programmed instructions to maintain an application context model for a protected application based on ingested logs. The application context model includes a map of network infrastructure associated with the protected application. Using the application context model, potential attack(s) against the protected application are identified and possible mitigation action(s) to take in response to one or more of the identified potential attack(s) are scored. A stored policy is executed to evaluate the possible mitigation action(s) based on the score. One or more of the possible mitigation action(s) are initiated on the identified potential attack(s) based on the evaluation.

This technology has a number of associated advantages including providing methods, non-transitory computer readable media, attack mitigation apparatuses, and network security systems that more effectively and quickly detect and mitigate malicious attacks, resulting in improved network security. With this technology, machine learning models are maintained based on continuously ingested client, security, and application logs. The models include an application context model that maps infrastructure associated with a protected application, including expected communication paths resulting from execution of the application logic. Potential attacks can be more efficiently identified, and possible mitigation actions can advantageously be scored using the application context model, resulting in improved network security for protected applications.

DETAILED DESCRIPTION

Figure 1:
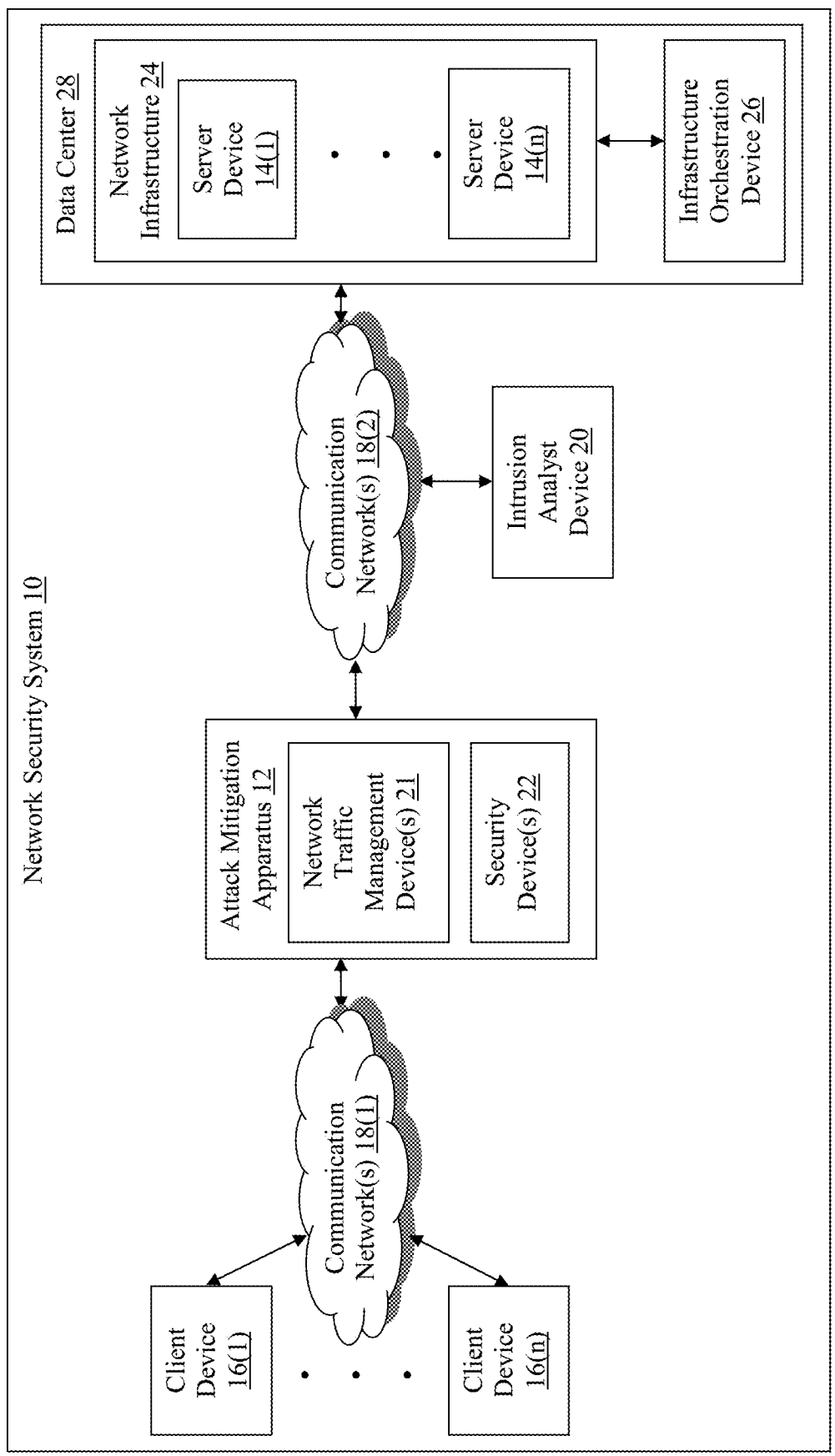
FIG. 1 is a block diagram of an exemplary network security system with an attack mitigation apparatus.

Referring to FIG. 1, an exemplary network environment that incorporates an exemplary network security system 10 is illustrated. The network security system 10 in this example includes an attack mitigation apparatus 12 that is coupled to server devices 14(1)-14(n), client devices 16(1)-16(n), and an intrusion analyst device 20 via communication network(s) 18(1) and 18(2), although the attack mitigation apparatus 12, server devices 14(1)-14(n), client devices 16(1)-16(n), and intrusion analyst device 20 may be coupled together via other topologies. The network security system 10 may include other network devices such as one or more routers or switches, for example, which are known in the art and thus will not be described herein. This technology provides a number of advantages including methods, non-transitory computer readable media, network security systems, and attack mitigation apparatuses that more efficiently and effectively detect and mitigate malicious network activity using dynamic application context.

In this particular example, the attack mitigation apparatus 12 includes network traffic management device(s) 21 and security device(s) 22, although other types of devices can be included in the network security system 20 internal or external to the attack mitigation apparatus 12, and one or more of the network traffic management device(s) 21 or security device(s) 22 can be located elsewhere.

In this example, the server devices 14(1)-14(n) are part of a application network infrastructure 24 for a protected application and can include any number of physical or virtual network devices that host instances of or otherwise support the application. Of course, any other one or more servers (not illustrated) could host applications that are protected according to the techniques disclosed herein. An optional infrastructure orchestration device 26 also is disposed within a same data center 28 as the network infrastructure 24, and is configured to manipulate the network infrastructure 24, as described and illustrated in more detail later, although the infrastructure orchestration device 26 could be disposed elsewhere in a different data center.

While the attack mitigation apparatus 12, network traffic management device(s) 21, security device(s) 22, infrastructure orchestration device 26, server devices 14(1)-14(n), and client devices 16(1)-16(n) are disclosed in FIG. 1 as dedicated hardware devices, one or more of the attack mitigation apparatus 12, network traffic management device(s) 21, security device(s) 22, infrastructure orchestration device 26, server devices 14(1)-14(n), or client devices 16(1)-16(n) can also be implemented in software within one or more other devices in the network security system 10.

As used herein, the term "module" refers to either an implementation as a dedicated hardware device or apparatus, or an implementation in software hosted by another hardware device or apparatus that may be hosting one or more other software components or implementations. As one example, the attack mitigation apparatus 12, as well as any of its components, models, or applications, can be a module implemented as software executing on one of the network traffic management device(s) 21 that also hosts a load balancing module to distribute network traffic across the server devices 14(1)-14(n), and many other permutations and types of implementations can also be used in other examples. Moreover, any or all of the network traffic management device 21, security device(s) 22, infrastructure orchestration device 26, server devices 14(1)-14(n), or client devices 16(1)-16(n), can be implemented, and may be referred to herein, as a module.

Figure 2:
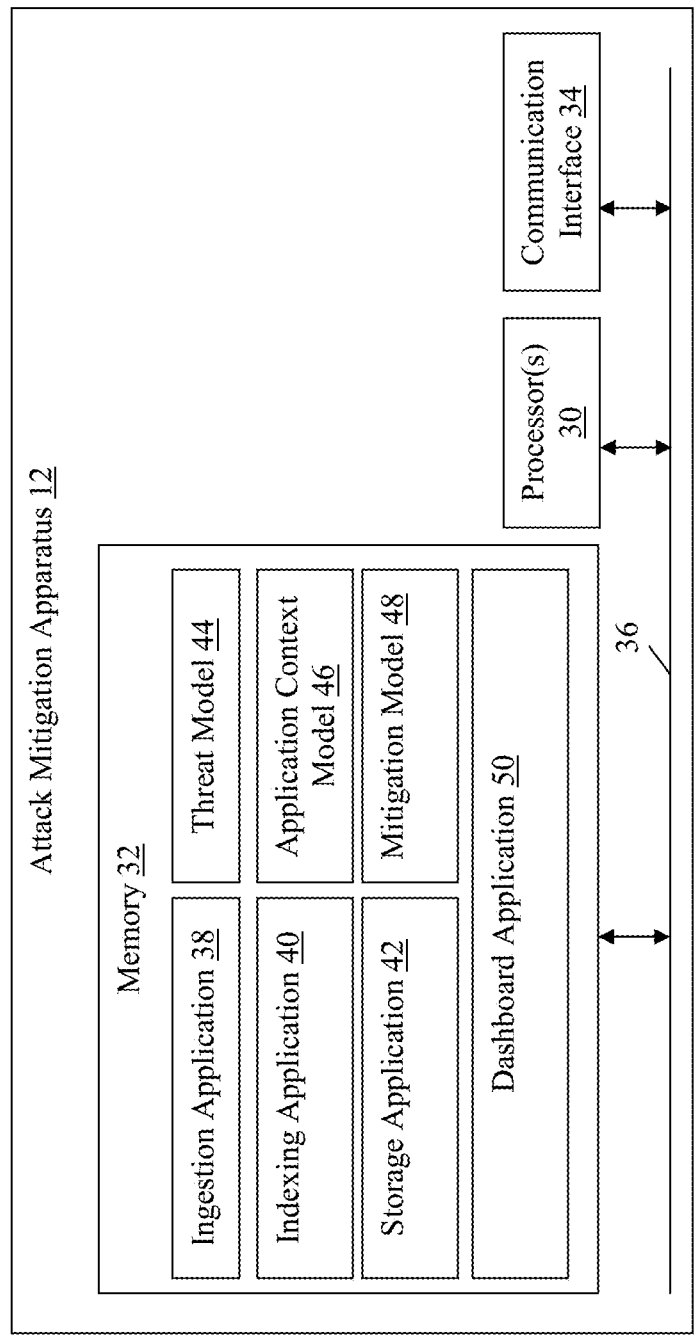
FIG. 2 is a block diagram of an exemplary attack mitigation apparatus.

Referring to FIGS. 1-2, the attack mitigation apparatus 12 of the network security system 10 may perform any number of functions in addition to detecting and mitigating attacks, including managing network traffic, load balancing network traffic across the server devices 14(1)-14(n), or accelerating network traffic associated with an application hosted by one or more of the server devices 14(1)-14(n), for example. The attack mitigation apparatus 12 in this example includes one or more processor(s) 30, a memory 32, and a communication interface 34, which are coupled together by a bus 36, although the attack mitigation apparatus 12 can include other types or numbers of elements in other configurations.

The processor(s) 30 of the attack mitigation apparatus 12 may execute programmed instructions stored in the memory 32 of the attack mitigation apparatus 12 for any number of the functions identified above. The processor(s) 30 of the attack mitigation apparatus 12 may include one or more central processing units (CPUs) or general purpose processors with one or more processing cores, for example, although other types of processor(s) can also be used.

The memory 32 of the attack mitigation apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 30, can be used for the memory 32.

Accordingly, the memory 32 of the attack mitigation apparatus 12 can store one or more applications that can include computer executable instructions that, when executed by the attack mitigation apparatus 12, cause the attack mitigation apparatus 12 to perform actions, such as to transmit, receive, or otherwise process messages, for example, and to perform other actions described and illustrated below with reference to FIGS. 3-7. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the attack mitigation apparatus 12 itself, may be located in virtual server(s) running in a cloud-based computing environment rather than being tied to one or more specific physical network computing devices. Also, the application(s) may be running in one or more virtual machines (VMs) executing on the attack mitigation apparatus 12. Additionally, in one or more examples of this technology, virtual machine(s) running on the attack mitigation apparatus 12 may be managed or supervised by a hypervisor.

In this particular example, the memory 32 of the attack mitigation apparatus 12 includes an ingestion application 38, an indexing application 40, a storage application 42, a threat model 44, an application context model 46, a mitigation model 48, and dashboard(s) 50. The ingestion application 38 is configured to obtain client, security, and application logs from various devices in the network security system 10. In particular, the ingestion application can communicate with software scripts or agents deployed at the client devices 16(1)-16(n) and the server devices 14(1)-14(n) to obtained logged client and application data.

The client logs can include data regarding the client device 16(1)-16(n), such as capabilities, the executing operating system, the executing web browser, and an IP address, among many other types of information that can be used by the threat model 44, for example, to generate a unique fingerprint for each of the client devices 16(1)-16(n). The application logs can include information regarding the type of associated ones of the server devices 14(1)-14(n), the processes executing on the server devices 14(1)-14(n), or the types and content of communications exchanged between the server devices 14(1)-14(n) or particular processes executing thereon, among other information that can be used by the application context model 46 to map the context or configuration of the protected application hosted by the server devices 14(1)-14(n).

The ingestion application 38 can further communicate with the network traffic management device(s) 21 and security device(s) 22 to obtain the security logs. The security logs can include information regarding logins for associated credentials (e.g., login time or number of failed logins), whitelist or blacklist information, historical threat data, traffic volume for originating IP addresses, or any other information that may be observed and logged by access policy, firewall, or any other type of the security device(s) 22 within the network security environment 10.

In some examples, the network traffic management device(s) 21 are facilitating SSL sessions between the client devices 16(1)-16(n) and one or more of the server devices 14(1)-14(n) and load balancing the connections to the one or more of the server devices 14(1)-14(n). In these examples, the network traffic management device(s) 21 can log header information, payload information, source and destination IP addresses, and session IDs, for example, among other information, which can be ingested by the ingestion application 38.

In other examples, the security device(s) 22 can include an access policy management device that can log credential information or number of login attempts for each of the client devices 16(1)-16(n), for example, which can also be ingested by the ingestion application 38. Other types and numbers of data can be included in the client, security, or application logs ingested by the ingestion application 38, additional examples of which are described and illustrated in more detail later.

The indexing application 40 in this example can process the logs ingested by the ingestion application 38 to index the data included therein. Accordingly, a plurality of indexers can organize the data based on a plurality of the associated parameters to facilitate relatively fast retrieval of the information. The storage application 42 can facilitate the storage of the data indexed by the indexing application 40, such as on a database or web server (or on any other non-transitory storage device). In one example, the indexing application 40 or storage application 42 can be implemented using Apache Splunk™, although other types of applications can also be used in other examples.

The threat model 44, application context model 46, and mitigation model 48 are updated dynamically utilizing machine learning algorithms based on the periodically or continuously ingested logs (e.g., application, client, or security logs). In this example, the threat model 44 is configured to identify potential attacks against the protected application hosted by the server devices 14(1)-14(n). Accordingly, the threat model 44 can learn over time, based on a machine learning algorithm, the types of behaviors observed via the ingested logs that correspond with malicious network activity, for example, and other methods of facilitating the identification of potential attacks using the threat model 44 can also be used. The threat model 44 may also score identified threats.

The application context model 46 in this example includes a map of infrastructure associated with the protected application, such as network devices (e.g., server devices 14(1)-14(n), routers, switches, or other intelligent devices), processes executing on the network devices, or other types of modules that collectively comprise the network infrastructure 24. The map includes an organization, layout, and configuration that provides the context for the network infrastructure 24. Accordingly, the application context model 46 can include a mapping of expected communication paths between modules of the network infrastructure 24 that is generated from application logic execution data in one or more of the ingested logs. In one example, a k-nearest neighbor machine learning algorithm is used to generate and dynamically update the application context model 46, although other types of machine learning models can also be used in other examples.

The mitigation model 48 is configured to determine and score possible mitigation actions to take in response to the potential attacks identified by the threat model 44. The mitigation actions can include dropping connections, blacklisting source IP addresses, or manipulating one or more modules within the network infrastructure 24 via instructions to the infrastructure orchestration device 26, for example, although other types of mitigation actions can be identified in other examples. The scores can be indicative of an impact on the protected application of implementing a possible mitigation action or an effectiveness of implementing the possible mitigation action with respect to mitigating an associated potential attacks, for example, although other types of scores can also be used.

In some examples, the mitigation model 48 can leverage the dynamically updated application context model 46 to score the identified potential mitigation actions. In particular, the mitigation model 48 can analyze the impact of implementing a potential mitigation action at a particular location along a communication path of a potential attack through the network infrastructure 24, for example. Additionally, the threat model 44 can leverage the application context model 46 to determine when there is a deviation from one or more of the expected communication paths indicating a potential attack. Accordingly, the threat model 44, application context model 46, and mitigation model 48 advantageously interoperate and collectively facilitate earlier and more effective detection and mitigation of malicious network activity, as described and illustrated in more detail later with reference to FIGS. 3 and 4.

The dashboard application 50 in this example is configured to generate and provide (e.g., to the intrusion analyst device 20) interactive graphical user interface (GUI) dashboards. The dashboard application 50 can populate the dashboards based on the data included in the ingested and stored logs (e.g., one or more of the client, security, or application logs), and can be configured to receive queries and collect results by interfacing with the indexing application 40 and the storage application 42. Advantageously, the dashboard application 50 can correlate results returned from the indexing application 40 using the application context model 46 or threat model 44 to generate an integrated result, which can be output via an interactive dashboard (e.g., an investigation dashboard) in response to a query, as described and illustrated in more detail later with reference to FIG. 5.

Referring back to FIGS. 1-2, the communication interface 34 of the attack mitigation apparatus 12 operatively couples and communicates between the attack mitigation apparatus 12, the server devices 14(1)-14(n), the client devices 16(1)-16(n), or the intrusion analyst device 20, which are coupled together at least in part by the communication network(s) 18(1) and 18(2), although other types or numbers of communication networks or systems with other types or numbers of connections or configurations to other devices or elements can also be used.

By way of example only, the communication network(s) 18(1) and 18(2) can include local area network(s) (LAN(s)) or wide area network(s) (WAN(s)), and can use TCP/IP over Ethernet and industry-standard protocols, although other types or numbers of protocols or communication networks can be used. The communication network(s) 18(1) and 18(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the attack mitigation apparatus 12 is illustrated in this example as including a single device, the attack mitigation apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the attack mitigation apparatus 12.

Additionally, one or more of the devices that together comprise the attack mitigation apparatus 12 in other examples can be standalone devices or integrated with one or more other devices or apparatuses, such as one or more of the server devices 14(1)-14(n), for example. Moreover, one or more of the devices of the attack mitigation apparatus 12 in these examples can be in a same or a different communication network including one or more public, private, or cloud networks, for example.

The network traffic management device(s) 21 of the attack mitigation apparatus 12 in this example include processor(s), a memory, and a communication interface, which are coupled together by a bus or other communication link, although other numbers or types of components could be used. The network traffic management device(s) 21 in this example can include a local traffic manager or a load balancer, for example, although other types of devices can also be used in other examples. Accordingly, the network traffic management device(s) 21 manage and operate on the network traffic exchanged between the client device 16(1)-16(n) and the application hosted by the server devices 14(1)-14(n), although the network traffic management device(s) 21 can provide other functionality for the network security system 10 in other examples.

The security device(s) 22 of the attack mitigation apparatus 12 in this example include processor(s), a memory, and a communication interface, which are coupled together by a bus or other communication link, although other numbers or types of components could be used. The security device(s) 22 can include application security device(s), access policy management device(s), or web application firewall device(s), for example, although other types of devices can also be used in other examples.

The security device(s) 22 generally facilitate secure and authorized access by users of the client devices 16(1)-16(n) to the application hosted by the server device 14(1)-14(n), and protect the application from attacks, although the security device(s) 22 can provide other functionality for the network security system 10 in other examples. In this example, both the network traffic management device(s) 21 and the security device(s) 22 are further configured to log data regarding observed or monitored network traffic, and selectively provide the logged data upon request to the attack mitigation apparatus 12, as described and illustrated in more detail later.

Each of the server devices 14(1)-14(n) of the network security system 10 in this example includes processor(s), a memory, and a communication interface, which are coupled together by a bus or other communication link, although other numbers or types of components could be used. The server devices 14(1)-14(n) in this example can include application servers, database servers, access control servers, or encryption servers, for example, that exchange communications along communication paths expected based on the application logic in order to facilitate interactions with the application by users of the client devices 16(1)-16(n). While the network infrastructure 24 is illustrated in FIG. 1 as including server devices 14(1)-14(n), the network infrastructure 24 can include routers, switches, and other physical or virtual intelligent devices or modules in other examples.

Accordingly, in some examples, one or more of the server devices 14(1)-14(n) process login and other requests received from the client devices 16(1)-16(n) via the communication network(s) 18(1) according to the HTTP-based application RFC protocol, for example. A protected web application may be operating on one or more of the server devices 14(1)-14(n) and transmitting data (e.g., files or web pages) to the client devices 16(1)-16(n) (e.g., via the network traffic management device(s) 21) in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the attack mitigation apparatus 12 itself rather than as a stand-alone server device communicating with the attack mitigation apparatus 12 via communication network(s) 18(2). In this example, the one or more of the server devices 14(1)-14(n) operate within the memory 32 of the attack mitigation apparatus 12. Additionally, the server devices 14(1)-14(n), and optionally other modules within the network infrastructure 24, can include software agents configured to monitor communications between the various devices and modules of the network infrastructure 24 and generate and provide logs including associated contextual data, as described and illustrated in more detail earlier.

The optional infrastructure orchestration device 26 in the data center 28 includes processor(s), a memory, and a communication interface, which are coupled together by a bus or other communication link (not illustrated), although other numbers or types of components could be used. The infrastructure orchestration device 26 manages the network infrastructure 24 to instantiate or remove virtual server instances or move particular client sessions to different server devices 14(1)-14(n), for example. The infrastructure orchestration device 26 can be a Kuberenetes™ controller implementation, for example, although other types of infrastructure orchestration devices 26 can also be used in other examples.

The client devices 16(1)-16(n) of the network security system 10 in this example include any type of computing device that can exchange network data and interface with an application hosted by one or more of the server devices 14(1)-14(n), such as mobile, desktop, laptop, or tablet computing devices, virtual machines (including cloud-based computers), or the like. Each of the client devices 16(1)-16(n) in this example includes a processor, a memory, and a communication interface, which are coupled together by a bus or other communication link (not illustrated), although other numbers or types of components could also be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18(1) and 18(2). The client devices 16(1)-16(n) may further include a display device, such as a display screen or touchscreen, or an input device, such as a keyboard for example (not illustrated). Additionally, one or more of the client devices 16(1)-16(n) can be configured to execute software code (e.g., JavaScript code within a web browser) in order to log client-side data and provide the logged data to the attack mitigation apparatus 12, as described and illustrated in more detail later.

The intrusion analyst device 20 includes any type of computing device that can exchange network data and interface with the dashboard application 50 hosted by the attack mitigation apparatus 12, such as a mobile, desktop, laptop, or tablet computing device, for example. Accordingly, the intrusion analyze device 20 includes a processor, a memory, and a communication interface, which are coupled together by a bus or other communication link (not illustrated), and can further include a display device, such as a display screen or touchscreen, or an input device, such as a keyboard for example (not illustrated), although other numbers or types of components could also be used. The intrusion analyst 20 can be used to obtain dashboards to facilitate manual detection, investigation, or mitigation of potential attacks, as described and illustrated in more detail later.

Although the exemplary network security system 10 with the attack mitigation apparatus 12, server devices 14(1)-14(n), client devices 16(1)-16(n), intrusion analyst device 20, and communication network(s) 18(1) and 18(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the attack mitigation apparatus 12, server devices 14(1)-14(n), client devices 16(1)-16(n), or intrusion analyst device 20, for example, may be configured to operate as virtual instances on the same physical machine. In other words, one or more of the attack mitigation apparatus 12, server devices 14(1)-14(n), client devices 16(1)-16(n), or intrusion analyst device 20 may operate on the same physical device rather than as separate devices communicating through communication network(s) 18(1) or 18(2). Additionally, there may be more or fewer attack mitigation apparatuses, client devices, server devices, or intrusion analyst devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 32, for one or more aspects of the present technology, as described and illustrated by way of the examples herein. The instructions in some examples include executable code that, when executed by one or more processors, such as the processor(s) 30, cause the processors to carry out steps necessary to implement the methods of the examples of this technology that are described and illustrated herein.

Figure 3:
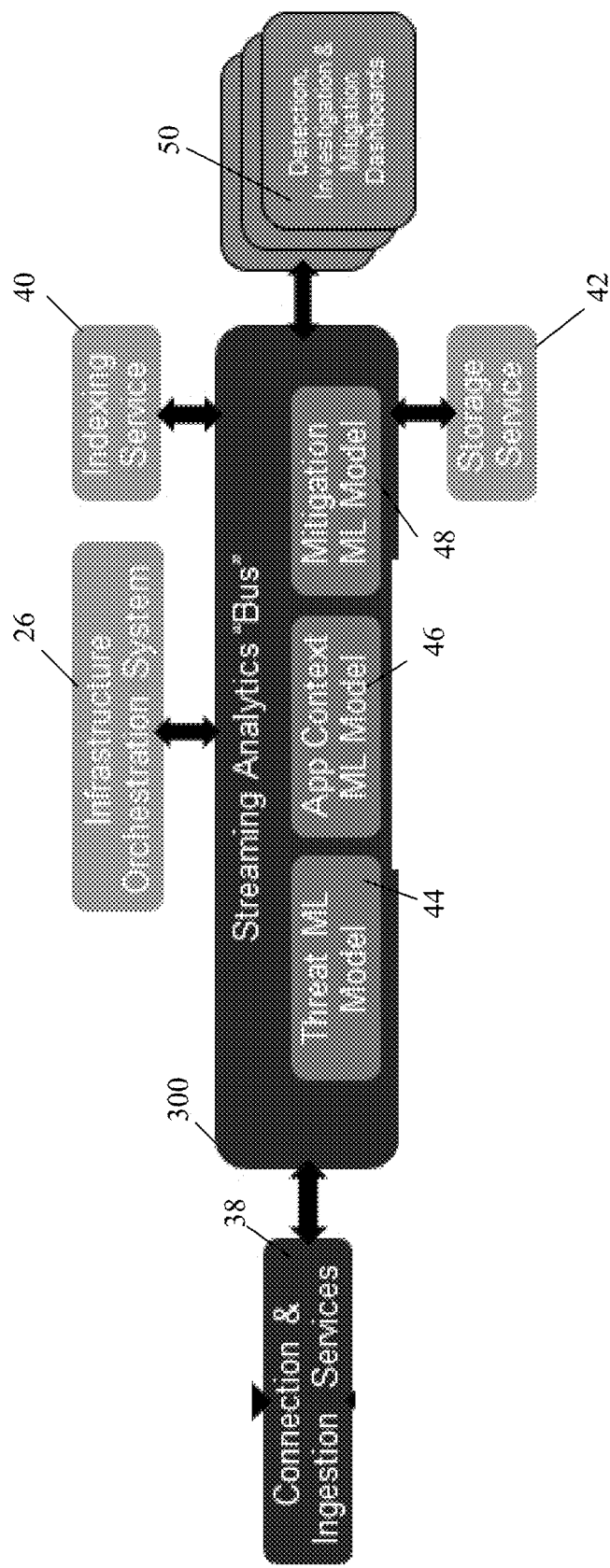
FIG. 3 is a flow diagram of exemplary components of an attack mitigation apparatus and associated interactions that facilitate detection and mitigation of malicious network activity.

Referring more specifically to FIG. 3, a flow diagram of exemplary components of the attack mitigation apparatus 12 and associated interactions that facilitate detection and mitigation of malicious network activity is illustrated. In this example, a streaming analytics bus 300 is illustrated as a functional representation of the process flow of this technology. The streaming analytics bus 300 includes the threat model 44, application context model, 46, and mitigation model 48 and can be implemented using Apache Spark™ in some examples, although other types of implementations can also be used. Accordingly, in this example, jobs can be submitted to the streaming analytics bus 300, or received from the streaming analytics bus 300, by various services, application, or modules, as illustrated in FIG. 3.

More specifically, the connection and ingestion services, also referred to herein as ingestion application 38, initially connects with application and security telemetry sources to initiate a stream-based log ingestion service of security and application logs. As explained earlier, the ingestion application 38 can communicate with the network traffic management device(s) 21 or other network traffic management modules disposed between the client devices 16(1)-16(n) to ingest security logs. Exemplary security logs can include access and policy violation and cloud security logs and exemplary data included in the security logs can include network intrusion and intrusion prevention system (IPS) alerts or workload or endpoint security alerts, for example, although other types of security logs and associated data can be ingested in other examples.

The ingestion application 38 can also communicate with software agents mounts to physical, virtual, and containerized modules and workloads in the network infrastructure 24 in the data center 28 in this example, or in a cloud network (not shown) in other examples, to ingest application logs. Exemplary application logs can include network connection, workload execution and connection, access, and cloud configuration and activity logs, although other types of application logs can be ingested in other examples.

Additionally, the ingestion application ingests client logs upon establishment of connections with the client devices 16(1)-16(n). The attack mitigation apparatus 12 can ingest the client logs based on data returned from scripts injected into responses to intercepted requests from the client devices 16(1)-16(n) and executed client-side. Other types of telemetry or other sources of ingested logs or data can also be used in other examples.

The application context model 46 of the streamlining analytics bus 300 is updated using a machine learning algorithm (e.g., a k-nearest neighbor algorithm) based on the ingested logs. In particular, the application context model 46 updates its map of the network infrastructure 24 associated with the protected application hosted by the server devices 14(1)-14(n). The map includes expected communication paths between modules of the network infrastructure 24, and is effectively a reconstruction of the logical execution structure of the protected application.

The threat model 44 of the streaming analytics bus 300 is then used to analyze the ingested logs to determine whether there is a potential attack on a protected application associated with the application log data. The threat model 44 can be a machine learning model initially generated via a bootstrapped aggregation algorithm and maintained based on any number or types of machine learning algorithms, such as genetic algorithms or temporal difference algorithms, for example.

In some examples, the threat model 44 is used parse the application context model 46 to determine whether there is a potential attack based on a deviation from the expected logical behavior of the protected application, as determined from the expected communication paths within the mapping of the network infrastructure 24. If the threat model 44 indicates there is a potential attack, an alert is generated to the mitigation model 48. The threat model 44 may also score the identified threats in order to determine when to generate an alert (e.g., based on a threshold threat score).

The mitigation model 48 of the streaming analytics bus 300 is then used to parse the application context model 46 to identify possible mitigation actions to take in response to the identified potential attack. The mitigation model 48 may also prioritize the scored threats based on the threat scores, and may determine which identified threats to consider for mitigation based on a comparison with a threshold. The identification or scoring can be based on the application context model 46, and the communication or application logic paths included therein.

The mitigation model 48 can be used to identify points along the communication path associated with a potential attack at which a mitigation action could be taken, and score each of the mitigation actions based on impact to the protected application or effectiveness at mitigating the potential attack. The mitigation model 48 in this example is also continuously updated based on a machine learning algorithm, such as a reinforcement learning or expectation maximization algorithm, although other type of algorithms and methods of updating the mitigation model 48, or one or more of the threat model 44 or application context model 46 can also be used in other examples.

In one example in which one of the possible mitigation actions identified by the mitigation model 48 is automatically implemented, an instruction can be initiated from the streaming analytics bus 300 to an infrastructure orchestration system, also referred to herein as the optional infrastructure orchestration device 26. The instruction can result in a manipulation of the network infrastructure 24 by the infrastructure orchestration device 26, examples of which are described and illustrated in more detail later. In another example in which one of the possible mitigation actions is automatically implemented, an instruction can flow from the streaming analytics bus 300 to one of the telemetry sources, such as one of the network traffic management device(s) 21 or security device(s) 22, for example.

In other examples, the dashboard application 50 is initiated to generate and output an interactive dashboard (e.g., an investigation dashboard) to the intrusion analyst device 20. The interactive dashboard can include information regarding the potential attack as well as the scored possible mitigation actions to facilitate manual selection and implementation of one or more of the possible mitigation actions by a user of the intrusion analyst device 20, for example.

Additionally, the indexing service, referred to herein as indexing application 40, and storage service, referred to herein as storage application 42, can facilitate the indexing and storing of the streaming logs ingested by the ingestion application 38. The indexing application 40 and storage application 42 can compress, tag, index, or store the data included in the ingested logs to facilitate manual identification of potential attacks via the dashboard application 50. Accordingly, the dashboard application 50 can utilize the indexed and stored data to generate interactive dashboards and respond to queries from the intrusion analyst device 20, as described and illustrated in more detail later.

Figure 4:
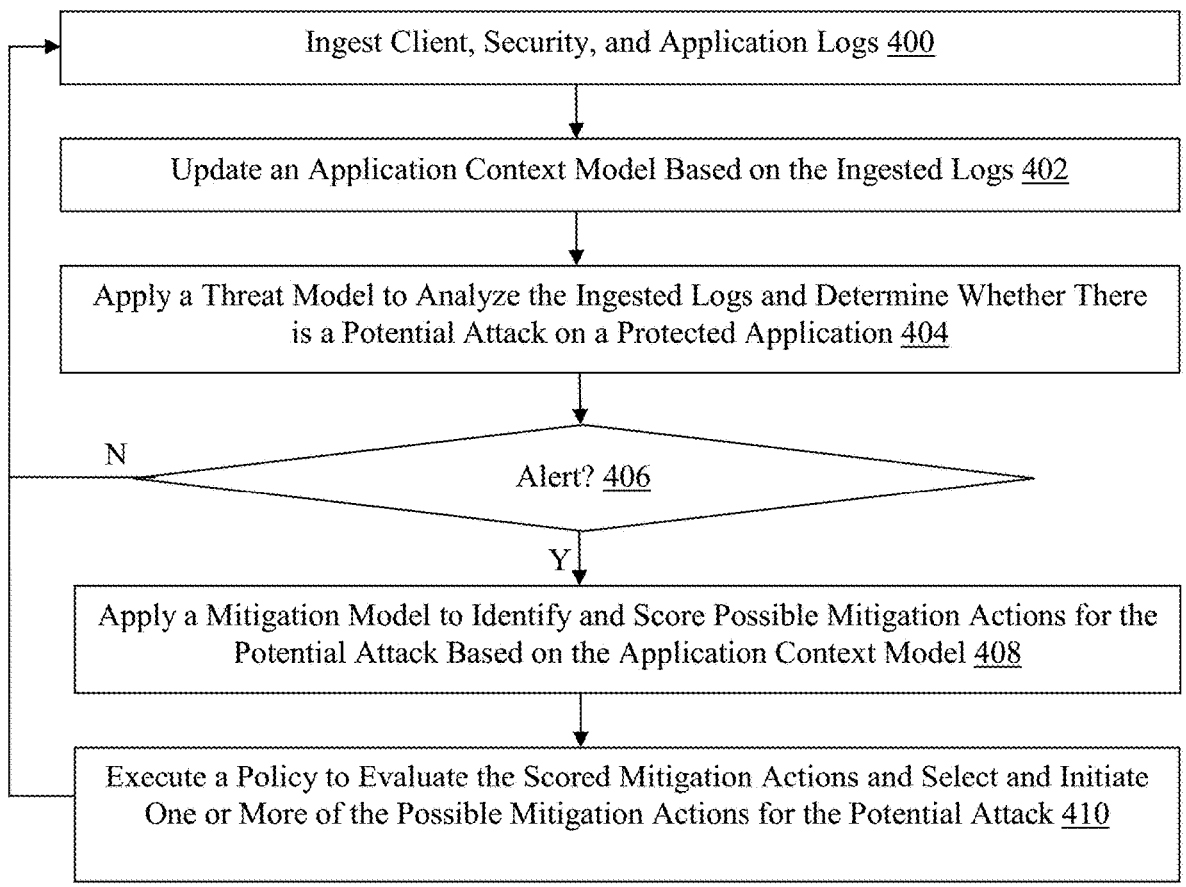
FIG. 4 is a flowchart of an exemplary method for detecting and mitigating malicious network activity based on dynamic application context.

Referring more specifically to FIG. 4, a flowchart of an exemplary method of detecting and mitigating malicious network activity based on dynamic application context is illustrated. In step 400 in this example, the attack mitigation apparatus 12 of the network security system 10 ingests client, security, and application logs. In one example, the attack mitigation apparatus 12 responds to initial requests from the client devices 16(1)-16(n) with software code (e.g., JavaScript embedded in a web page) that, when executed client-side, causes the client devices 16(1)-16(n) to log and return data regarding the capabilities or other information about the client devices 16(1)-16(n).

The security logs can be obtained from the network traffic management device(s) or security device(s) 22, as described and illustrated in more detail earlier. Additionally, the application logs can be obtained from software agents attached to modules, such as the server devices 14(1)-14(n), within the network infrastructure 24. Other methods of ingesting the logs can also be used in other examples. While step 400 is illustrated in FIG. 4 as one of several sequential steps, the client, security, or application logs are streamed continuously in some examples, and one or more of steps 400-410 can be performed in a different order or in parallel.

In step 402, the attack mitigation apparatus 12 updates the application context model 46 based on the ingested logs. As explained in more detail earlier, the application context model 46 includes a reconstruction of the logical execution structure of the protected application hosted by the server devise 14(1)-14(n). In some examples, the ingested application logs include transmission and process execution logs, access logs, and data indicating what and how the server devices 14(1)-14(n), processes executed thereon, and other modules within the network infrastructure 24 interact.

In these examples, the attack mitigation apparatus 12 processes the ingested logs, including the application logs, using a machine learning algorithm and updates the application context model 46 to generate a mapping of the expected communication or application logic paths. Accordingly, via the application context model 46, the attack mitigation in this example maintains dynamic configuration and context information associated with the protected application.

In step 404, the attack mitigation apparatus 12 applies the threat model 44 to analyze the ingested logs and determine whether there is a potential attack on the protected application. In one example, the attack mitigation apparatus 12 can apply the threat model 44, which is configured to parse the application context model 46 to determine from application logic execution data in one or more of the ingested logs when there is a deviation from an expected communication path within the network infrastructure 24.

In another example, security logs can be ingested from a load balancer of the network traffic management device(s) 21 and an access control device of the security device(s) 22. In this example, an IP address and a session ID associated with a connection with one of the client devices 16(1)-16(n) comprise data that is common and logged by each of the load balancer and access control device, but each of those modules also has unique associated data that can be correlated and analyzed based on the application of the threat model 44 to the ingested logs.

For example, based on the application of the threat model 44, the attack mitigation apparatus 12 may be able to determine that multiple identities from a same one of the client devices 16(1)-16(n) are logged into the protected application. In another example, the attack mitigation apparatus 12 can determines that a same one of the client devices 16(1)-16(n) appears as if it is originating from different countries or geographic locations. Many other types of potential attacks or malicious network activity can also be identified in step 404, resulting in the generation and output of an alert. Based on any number of factors (e.g., attack severity, breadth, or impact), the threat model 44 can also score identified potential attacks and selectively generate an alert based on the threat scores (e.g., based on a comparison of the threat scores with a threshold threat score).

In step 406, the attack mitigation apparatus 12 determines whether an alert has been generated based on the application of the threat model in step 404 (e.g., a threat score for a potential attack exceeds a threshold). If the attack mitigation apparatus 12 determines that an alert has not been generated, then the No branch is taken back to step 400 and the attack mitigation apparatus continues ingesting logs, updating one or more of the models, and applying the threat model. However, if the attack mitigation apparatus 12 determines that an alert is generated, then the Yes branch is taken to step 408.

In step 408, the attack mitigation apparatus 12 applies the mitigation model 48 to identify and score possible mitigation actions to be taken for the alerted potential attack. In one example, the attack mitigation apparatus 12 applies the mitigation model 48 to parse the state of the protected application held by the application context model 46 to determine point(s) along a communication path within the network infrastructure 24 that a mitigation action could be taken with respect to the particular alerted potential attack.

Based on the point(s) and mitigation action type(s), for example, the attack mitigation apparatus 12 applies the mitigation model 48 to score the possible mitigation actions. In this example, the attack mitigation apparatus 12 generates two scores, one of which is indicative of the likely impact to the protected application of each mitigation action that could be taken and another of which is indicative of a likely effectiveness of implementing the possible mitigation action with respect to mitigating the potential attack.

In other examples, the attack mitigation apparatus 12 generates one score that reflects the impact and effectiveness factors, and other types and numbers of scores could be generated in other examples. In one particular example, terminating a session associated with a potential attack may have a relatively low score for likely effectiveness, as a malicious user may simply believe that the connection was dropped and may reinitiate the session. However, terminating a session would have little impact on the protected application, and the associated score could be generated accordingly.

In addition to interrupting or terminating a session associated with one of the client device 16(1)-16(n) (e.g., at a router or switch device in the network infrastructure 24), another possible mitigation action can include modifying access control parameters for a particular user credential (e.g., a user ID). In yet another example, a possible mitigation action can include isolating a session associated with a potential attack to a particular host or application instance within the network infrastructure 24 in order to obtain intelligence regarding the session, user, or one of the client devices 16(1)-16(n), for example. Other types of possible mitigation actions can also be identified in step 408.

In step 410, the attack mitigation apparatus 12 executes a stored policy to evaluate the scored possible mitigation actions and, optionally, automatically select and initiate one or more of the possible mitigation actions for the potential attack. In this example, the policy includes rules for automatically implementing one or more of the possible mitigation actions, such as based on a threshold score that can be compared to the score(s) generated in step 408.

Optionally, automated initiation of the possible mitigation action(s) can cause the attack mitigation apparatus 12 to engage another module within the network security environment 10. For example, the attack mitigation apparatus 12 can communicate with an access control device of the security device(s) 22 to modify access control parameters in order to freeze a particular account.

In another example, the attack mitigation apparatus 12 can send an instruction to the infrastructure orchestration device 26 in order to manipulate one or more modules within the network infrastructure 24. In particular, the attack mitigation apparatus 12 can instruct the infrastructure orchestration device 26 to instantiate an application instance and move user sessions in order to isolate a particular session. Other types of automated mitigation actions can also be initiated in step 410. Subsequent to initiating one or more of the possible mitigation action(s) in step 410, the attack mitigation apparatus proceeds back to step 400 and continues to ingest logs, update the application context model 46, and apply the threat model 44 to determine whether there are additional potential attacks.

While in this example the possible mitigation action(s) are initiated automatically, based on execution of a stored policy, in other examples, the alert generated in step 404 can cause the dashboard application 50, for example, to output an interactive mitigation dashboard to the intrusion analyst device 20. The mitigation dashboard can include an indication of the possible mitigation actions and corresponding score(s), and facilitate selection and manual initiation of one or more of the possible mitigation actions in this example. In yet other examples, combinations of automated and manually-selected ones of the possible mitigation actions can be initiated in order to defend a potential attack on behalf of the protected application.

Figure 5:
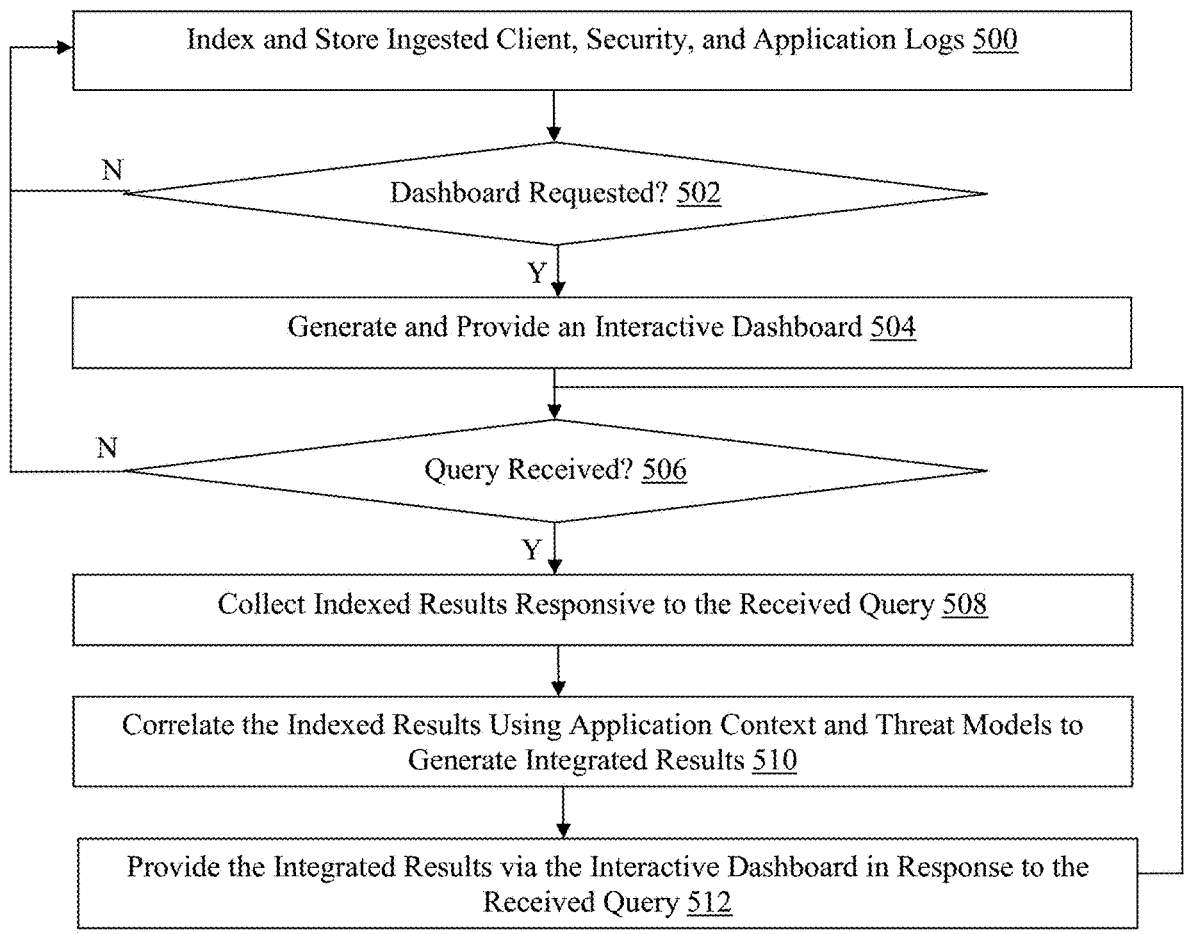
FIG. 5 is a flowchart of an exemplary method for facilitating detection of malicious network activity using an interactive dashboard and query results that are integrated using application context and threat models.

Referring more specifically to FIG. 5, a flowchart of an exemplary method of facilitating detection of malicious network activity using an interactive dashboard and query results that are integrated using the application context model 46 and the threat model 48 is illustrated. In step 500 in this example, the attack mitigation apparatus 12 of the network security system 10 indexes and stores ingested client, security, and application logs, as described and illustrated earlier with reference to step 400 of FIG. 4.

The indexing application 40 can use a plurality of indexers that each index the data included in the ingested logs based on particular associated parameter(s) to facilitate relatively fast retrieval of results responsive to received queries. The ingested logs can be stored in the memory 32, on a database server (not shown), or elsewhere internal or external to the attack mitigation apparatus 12 in the network security environment 10.

In step 502, the attack mitigation apparatus 12 determines whether a dashboard is requested, such as by the intrusion analyst device 20, for example. The dashboard can be an interactive investigation dashboard, for example, that facilitates review of the data included in the ingested logs by a user of the intrusion analyst device 20 for manual identification of potential attacks. If the attack mitigation apparatus 12 determines that a dashboard has not been requested, then the No branch is taken back to step 500 and the attack mitigation apparatus 12 continues to index and store ingested client, security, and application logs. However, if the attack mitigation apparatus 12 determines in step 502 that a request for a dashboard has been received from the intrusion analyst device 20, then the Yes branch is taken to step 504.

In step 504, the attack mitigation apparatus 12 generates and provides an interactive dashboard or GUI to the intrusion analyst device 20 from which the request for the dashboard originated in this example. The dashboard application 50 can generate the requested dashboard based on data included in the indexed and stored ingested logs, as well as current or historical identified potential attacks, and other information can also be included on the generated dashboard.

Figure 6:
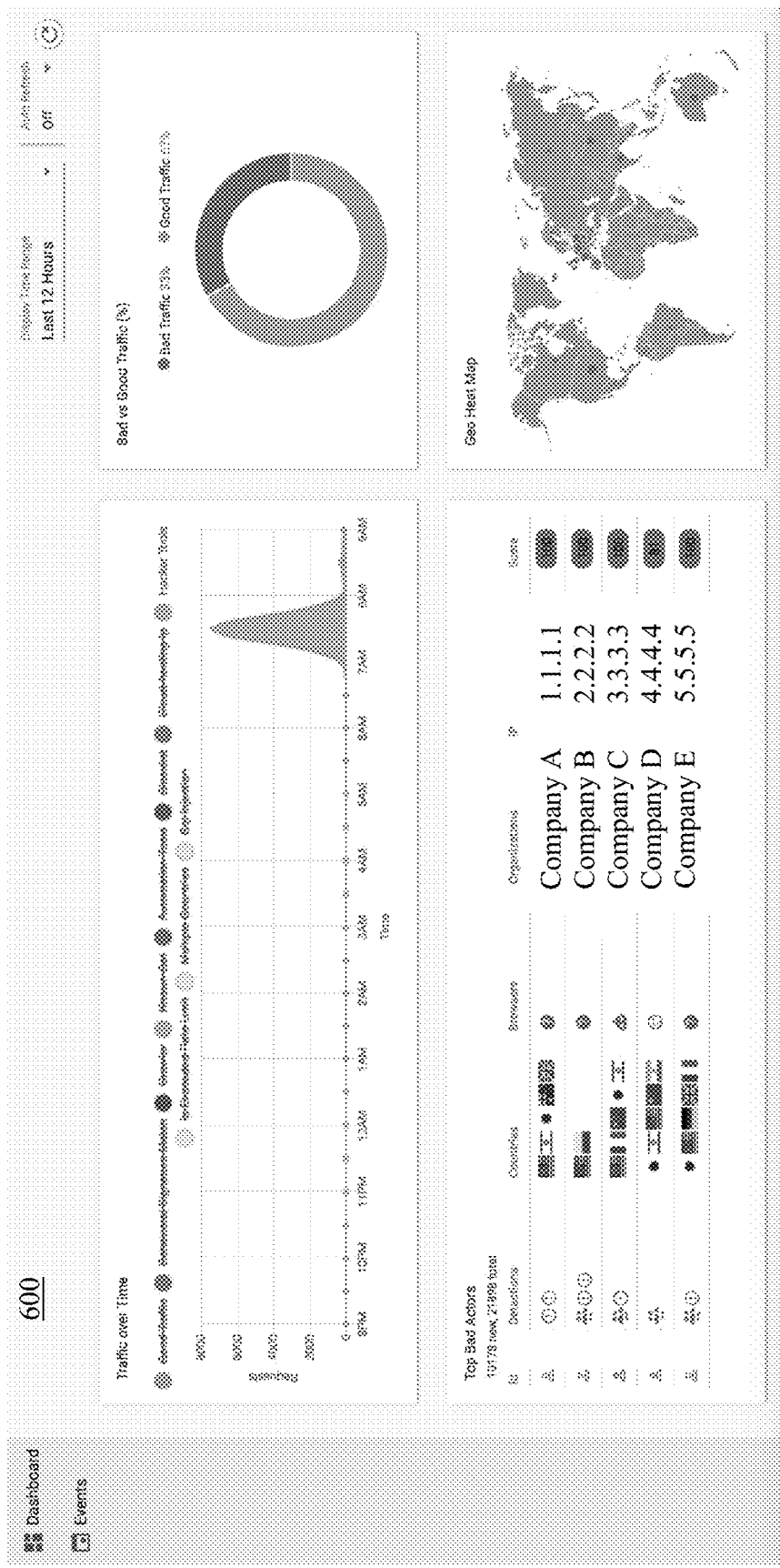
FIG. 6 is an exemplary interactive investigation dashboard illustrating an overall attack state associated with the use of hacking tools for a protected application.

Referring more specifically to FIG. 6, an exemplary interactive investigation dashboard 600 illustrating an overall attack state associated with the use of hacking tools for a protected application is illustrated. The investigation dashboard 600 in this example provides an overview of the state of the protected application with respect to historical observed potential attacks of different selectable types, percentage of good and bad traffic, the top potential bad actors, optionally ranked by an associated score, and a geographical heat map illustrating sources of malicious network traffic, although other types of information can also be included. In this particular example, there was a spike between 7-8 AM in the use of hacker tools against the protected application.

Referring back to FIG. 5, in step 506, the attack mitigation apparatus 12 determines whether a query is received, such as from the intrusion analyst device 20 based on an interaction with the provided interactive dashboard. The query can relate to any parameter of information included in the indexed and stored ingested logs, such as a particular application path associated with network traffic or an origin country, IP address, or user ID of network traffic directed to the protected application, for example, although many other types and numbers of parameters can be included in a received query. The query can be received based on manual entry of particular parameters or selection(s) via the provided dashboard, for example. If the attack mitigation apparatus 12 determines that a query has not been received, then the No branch is taken back to step 500 and the attack mitigation apparatus 12 continues to index and store ingested client, security, and application logs. However, if the attack mitigation apparatus 12 determines that a query has been received, then the Yes branch is taken to step 508.

In step 508, the attack mitigation apparatus 12 collects indexed results responsive to the received query. The attack mitigation apparatus 12 can process the query with the indexing application 40 and the storage application 42, which can collect a set of results based on the query parameters for each of the indexers utilized to index the data in step 500. As described and illustrated earlier, Apache Splunk™ can be used in one example to implement the indexing application 40 and storage application 42 and facilitate return of the collected results from each of its associated indexers, although other elastic map reduce implementations and other methods of collecting the indexed results can also be used. In this example, each of the indexers results a result that is ordered based on a corresponding parameters of the received query.

In step 510, the attack mitigation apparatus 12 advantageously correlates the indexed results using the application context model 46 and the threat model 44 to generate integrated results. The application context model 46 maintains the dynamic state of the protected application with respect to the network infrastructure 24 in an associated map and the threat model 44 maintains the state of the potential attacks against the protected application. Accordingly, by processing the collected results against the application context model 46 and the threat model 44, the attack mitigation apparatus 12 can correlate data in the collected results in order to interrelate and integrate the results to provide a more holistic view.

Once results of a query are collected and received from the indexed data stores in step 508, the attack mitigation apparatus 12 initiates processing job(s) against the threat model 44 and application context model 46 passing parameters such as client device IP address, client device fingerprint, presence of anti-virus software at one or more of the client devices 16(1)-16(n), revision of an anti-virus software at one or more of the client devices 16(1)-16(n), or a total software inventory of one or more of the client devices 16(1)-16(n), as well as executing programs and processes at one or more of the client devices 16(1)-16(n). The jobs use the threat model 44 and application context model 46 as state machines to integrate and order the indexed parameters and return results in a human-readable form (e.g., a table).

Figure 7:
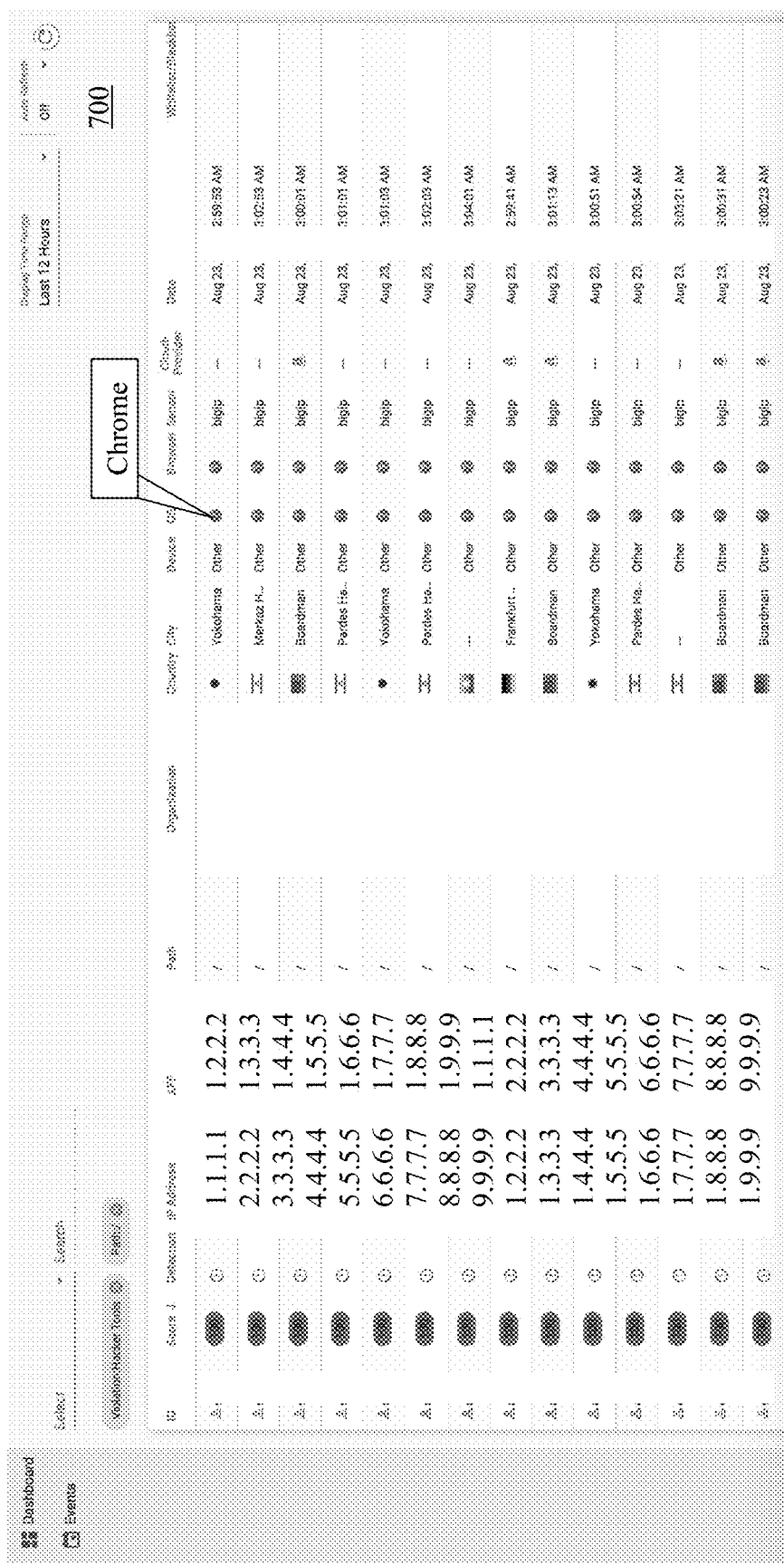
FIG. 7 is an exemplary interactive investigation dashboard identifying an attacker attempting to map the internal file structure of a protected application.

In step 512, the attack mitigation apparatus 12 provides the integrated result via the interactive dashboard in response to the query received in step 506. Referring more specifically to FIG. 7, an exemplary interactive investigation dashboard 700 identifying an attacker attempting to map the internal file structure of a protected application is illustrated. In this example, a particular service associated with a protected application is being attacked and compromised such that the attacker is attempting to map the internal file structure of the protected application. In the investigation dashboard 700, a plurality of integrated results of a query for the root "/" path parameter associated with the protected application is illustrated.

Referring back to FIG. 5, subsequent to providing the integrated results, the attack mitigation apparatus 12 proceeds back to step 506 and again determines whether an additional query is received. In other examples, one or more of steps 500-512 can be performed in a different order or in parallel. In particular, the indexing and storage in step 500 can be performed continuously and in parallel with one or more of steps 502-512 in response to streaming ingestion of client, security, and application logs.

With this technology, potential attacks and malicious network activity can be identified and mitigated relatively efficiently. In particular, this technology leverages ingested client, security, and application logs processed by threat, dynamic application context, and mitigation machine learning models to facilitate improved, early identification of potential attacks and evaluation of possible mitigation actions.

The application context model in particular advantageously maintains the dynamic context and configuration of the network infrastructure associated with a protected application to allow detection of anomalous communication paths that may indicate a potential attack. Additionally, this technology more effectively correlates and integrates large data sets responsive to queries using the threat and application context models to facilitate improved manual investigation and identification of potential attacks.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for network attack mitigation implemented by a network security system comprising, network infrastructure devices, attack mitigation apparatuses, or client devices, the method comprising:

maintaining an application context model for a protected application based on an ingested historical log, the application context model comprising an estimated communication path across network infrastructure associated with the protected application, wherein the ingested historical log is indexed and results are collected from the indexed historical log responsive to a query;

applying the maintained application context model or a threat model to application logic execution data in an ingested current log to identify a potential attack against the protected application based on a deviation from the estimated communication path;

generating a score for a mitigation action to take in response to the identified potential attack, wherein the generating further comprises generating an integrated result by correlating the collected results using the maintained application context model or the threat model; and initiating the mitigation action based on the generated score and providing the generated integrated result in response to the query.

2. The method of claim 1, wherein the generated score is based at least in part on an impact on the protected application of implementing the mitigation action and an effectiveness of implementing the mitigation action to mitigate the identified potential attack.

3. The method of claim 1, wherein the mitigation action comprises manipulating the network infrastructure and the method further comprises generating and sending an instruction to an infrastructure orchestration module to facilitate the manipulation.

4. The method of claim 1, wherein the ingested historical log comprise a client log, a security log, or an application log, and the method further comprises:

ingesting the client log from a client script injected into responses to intercepted client requests, the security log from an attack mitigation apparatus disposed between one or more clients and the network infrastructure, and the application log from an agent disposed on the network infrastructure; and updating the application context model, a threat model, or a mitigation model utilizing one or more machine learning algorithms and the ingested historical log.

5. The method of claim 4, further comprising:

applying the threat model to identify the potential attack; and applying the mitigation model to generate the score.

6. The method of claim 1, further comprising:

determining when there is a deviation from the estimated communication path; and generating an alert when the determination indicates there is a deviation from the estimated communication path.

7. The method of claim 1, further comprising:

generating a threat score for the potential attack;

determining when the threat score exceeds a threshold threat score; and generating an alert when the determination indicates the threat score exceeds the threshold threat score.

8. An attack mitigation apparatus, comprising memory comprising programmed instructions stored thereon and one or more processors configured to be capable of executing the stored programmed instructions to:

maintain an application context model for a protected application based on an ingested historical log, the application context model comprising an estimated communication path across network infrastructure associated with the protected application, wherein the ingested historical log is indexed and results are collected from the indexed historical log responsive to a query;

apply the maintained application context model or a threat model to application logic execution data in an ingested current log to identify a potential attack against the protected application based on a deviation from the estimated communication path;

generate a score for a mitigation action to take in response to the identified potential attack, wherein the generating further comprises generating an integrated result by correlating the collected results using the maintained application context model or the threat model; and
initiate the mitigation action based on the generated score and providing the generated integrated result in response to the query.

9. The attack mitigation apparatus of claim 8, wherein the generated score is based at least in part on an impact on the protected application of implementing the mitigation action and an effectiveness of implementing the mitigation action to mitigate the identified potential attack.

10. The attack mitigation apparatus of claim 8, wherein the mitigation action comprises manipulating the network infrastructure and the method further comprises generating and sending an instruction to an infrastructure orchestration module to facilitate the manipulation.

11. The attack mitigation apparatus of claim 8, wherein the ingested historical log comprise a client log, a security log, or an application log, and the method further comprises:
    ingest the client log from a client script injected into responses to intercepted client requests, the security log from an attack mitigation apparatus disposed between one or more clients and the network infrastructure, and the application log from an agent disposed on the network infrastructure; and
    update the application context model, a threat model, or a mitigation model utilizing one or more machine learning algorithms and the ingested historical log.

12. The attack mitigation apparatus of claim 11, wherein the processors are further configured to be capable of executing the stored programmed instructions to:
    apply the threat model to identify the potential attack; and
    apply the mitigation model to generate the score.

13. The attack mitigation apparatus of claim 8, wherein the processors are further configured to be capable of executing the stored programmed instructions to:
    determine when there is a deviation from the estimated communication path; and
    generate an alert when the determination indicates there is a deviation from the estimated communication path.

14. The attack mitigation apparatus of claim 8, wherein the processors are further configured to be capable of executing the stored programmed instructions to:
    generate a threat score for the potential attack;
    determine when the threat score exceeds a threshold threat score; and
    generate an alert when the determination indicates the threat score exceeds the threshold threat score.

15. A non-transitory computer readable medium having stored thereon instructions for network attack mitigation comprising executable code that, when executed by one or more processors, causes the processors to:
    maintain an application context model for a protected application based on an ingested historical log, the application context model comprising an estimated communication path across network infrastructure associated with the protected application, wherein the ingested historical log is indexed and results are collected from the indexed historical log responsive to a query;
    apply the maintained application context model or a threat model to application logic execution data in an ingested current log to identify a potential attack against the protected application based on a deviation from the estimated communication path;
    generate a score for a mitigation action to take in response to the identified potential attack, wherein the generating further comprises generating an integrated result by correlating the collected results using the maintained application context model or the threat model; and
    initiate the mitigation action based on the generated score and providing the generated integrated result in response to the query.

16. The non-transitory computer readable medium of claim 15, wherein the generated score is based at least in part on an impact on the protected application of implementing the mitigation action and an effectiveness of implementing the mitigation action to mitigate the identified potential attack.

17. The non-transitory computer readable medium of claim 15, wherein the mitigation action comprises manipulating the network infrastructure and the method further comprises generating and sending an instruction to an infrastructure orchestration module to facilitate the manipulation.

18. The non-transitory computer readable medium of claim 15, wherein the ingested historical log comprise a client log, a security log, or an application log, and the method further comprises:
    ingest the client log from a client script injected into responses to intercepted client requests, the security log from an attack mitigation apparatus disposed between one or more clients and the network infrastructure, and the application log from an agent disposed on the network infrastructure; and
    update the application context model, a threat model, or a mitigation model utilizing one or more machine learning algorithms and the ingested historical log.

19. The non-transitory computer readable medium of claim 18, wherein the executable code, when executed by the processors further causes the processors to:
    apply the threat model to identify the potential attack; and
    apply the mitigation model to generate the score.

20. The non-transitory computer readable medium of claim 15, wherein the executable code, when executed by the processors further causes the processors to:
    determine when there is a deviation from the estimated communication path; and
    generate an alert when the determination indicates there is a deviation from the estimated communication path.

21. The non-transitory computer readable medium of claim 15, wherein the executable code, when executed by the processors further causes the processors to:
    generate a threat score for the potential attack;
    determine when the threat score exceeds a threshold threat score; and
    generate an alert when the determination indicates the threat score exceeds the threshold threat score.

22. A network security system, comprising one or more attack mitigation apparatuses, network infrastructure devices, network traffic management devices, or client devices with memory comprising programmed instructions stored thereon and one or more processors configured to be capable of executing the stored programmed instructions to:
    maintain an application context model for a protected application based on an ingested historical log, the application context model comprising an estimated communication path across network infrastructure associated with the protected application, wherein the ingested historical log is indexed and results are collected from the indexed historical log responsive to a query;
    apply the maintained application context model or a threat model to application logic execution data in an ingested current log to identify a potential attack against the protected application based on a deviation from the estimated communication path;

generate a score for a mitigation action to take in response to the identified potential attack, wherein the generating further comprises generating an integrated result by correlating the collected results using the maintained application context model or the threat model; and initiate the mitigation action based on the generated score and providing the generated integrated result in response to the query.

23. The network security system of claim 22, wherein the generated score is based at least in part on an impact on the protected application of implementing the mitigation action and an effectiveness of implementing the mitigation action to mitigate the identified potential attack.

24. The network security system of claim 22, wherein the mitigation action comprises manipulating the network infrastructure and the method further comprises generating and sending an instruction to an infrastructure orchestration module to facilitate the manipulation.

25. The network security system of claim 22, wherein the ingested historical log comprise a client log, a security log, or an application log, and the method further comprises:

ingest the client log from a client script injected into responses to intercepted client requests, the security log from an attack mitigation apparatus disposed between one or more clients and the network infrastructure, and the application log from an agent disposed on the network infrastructure; and update the application context model, a threat model, or a mitigation model utilizing one or more machine learning algorithms and the ingested historical log.

26. The network security system of claim 25, wherein the processors are further configured to be capable of executing the stored programmed instructions to:

apply the threat model to identify the potential attack; and apply the mitigation model to generate the score.

27. The network security system of claim 22, wherein the processors are further configured to be capable of executing the stored programmed instructions to:

determine when there is a deviation from the estimated communication path; and generate an alert when the determination indicates there is a deviation from the estimated communication path.

28. The network security system of claim 22, wherein the processors are further configured to be capable of executing the stored programmed instructions to:

generate a threat score for the potential attack;

determine when the threat score exceeds a threshold threat score; and generate an alert when the determination indicates the threat score exceeds the threshold threat score.

* * * * *